June 4, 1963 W. T. WALLACE 3,092,696
BELT TENSION INDICATOR AND ENGINE CUT-OFF
Filed Feb. 14, 1961
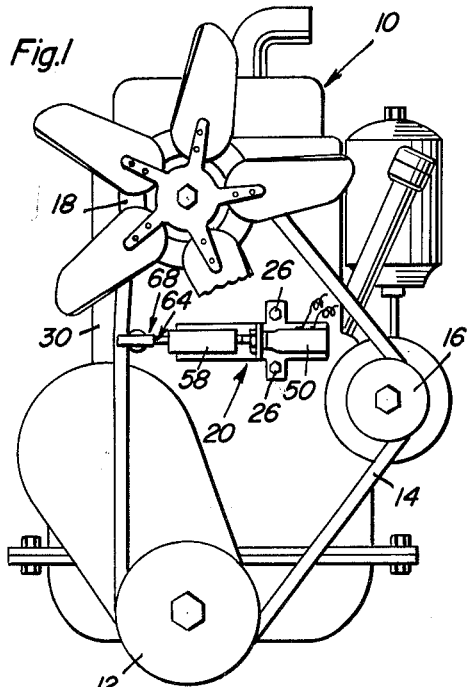
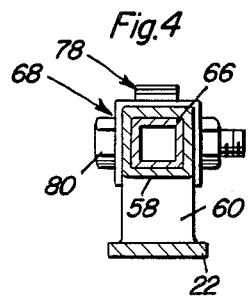
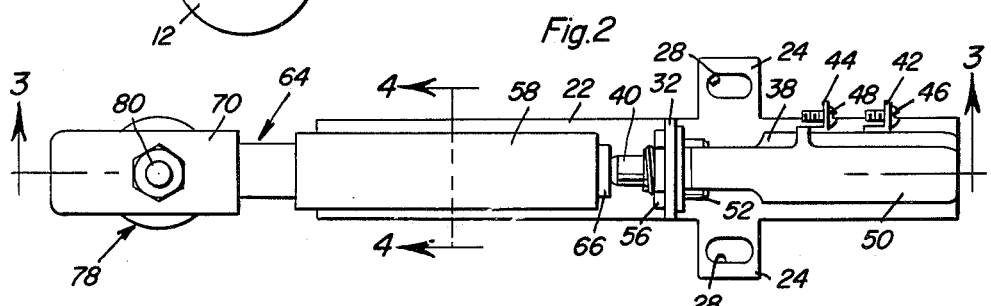
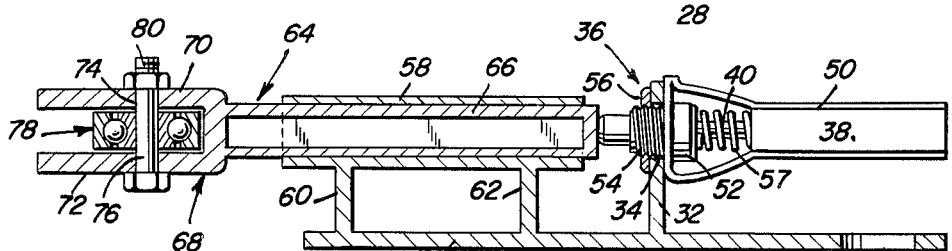
Wilmer T. Wallace
INVENTOR.
BY Clarence A. O'Brien
and Harvey B. Jackson
Attorneys

United States Patent Office 3,092,696
Patented June 4, 1963

3,092,696
BELT TENSION INDICATOR AND ENGINE CUT-OFF
Wilmer T. Wallace, Hampton, Iowa
Filed Feb. 14, 1961, Ser. No. 89,283
5 Claims. (Cl. 200—61.18)

This invention relates to a novel and useful belt tensioner indicator and engine cut-off and is specifically adapted to properly tension the fan belt of an internal combustion engine and to indicate, by interrupting or opening the ignition circuit of the internal combustion engine, when the fan belt has stretched beyond a predetermined amount.

In order for a fan belt to operate efficiently and in a manner causing a minimum amount of friction it is necessary for the fan belt to be properly tensioned. When installing a new fan belt the tension is properly adjusted and quite often it become necessary to again adjust the tension of a new fan belt after it has operated for a short period of time. Because of the manner in which fan belts are constructed they sometimes will stretch a certain degree during an initial "break-in." Additionally, throughout extended operation of a fan belt, the belt will stretch and certain wear will occur which has a tendency to reduce the tension of the belt and thus its efficiency. Accordingly, in order to insure efficient operation of a fan belt it must be periodically checked for signs of wear and for stretching and suitable adjustments and/or replacements must be made as becomes necessary. Throughout the life of a fan belt it may be necessary to adjust the tensioning of the fan belt many times in order to insure efficient operation. Automotive fan belts are quite frequently taken for granted and are thus overlooked during periodic inspections which are made in the internal combustion engine of a vehicle. As a result, a large percentage of motor vehicles are provided with fan belts, power steering belts and air conditioning belts, etc. that are not operating efficiently because of their not being properly tensioned.

Accordingly, it is the main object of this invention to provide a belt tensioning device which will be capable of constantly and efficiently adjusting the tension of various types of endless belts used on internal combustion engines.

A further object of this invention is to provide a belt tensioning device which will be capable of being mounted on an internal combustion engine in various positions relative to a belt which is to be properly tensioned thereby whereby a universal belt tensioning device may be provided for substantially all types of motor vehicles.

A still further object of this invention, in accordance with the preceding objects, is to provide a belt tensioning device which will, in addition to properly tensioning a fan belt, also provide a means whereby the operator of a motor vehicle may be signaled in the event a fan belt with which the belt tensioning device is associated should break or become disengaged with the pulleys about which it is normally entrained. In this manner, the operator of a vehicle may be warned should the fan belt, which normally powers the fan, a generator and other engine accessories, be rendered incapable of performing its function.

A final object to be specifically enumerated herein is to provide a belt tensioning indicator and engine cut-off which will conform to conventional forms of manufacture, be of simple construction and efficient in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front end elevational view of a conventional type of internal combustion engine shown with the belt tensioning device of the instant invention mounted thereon and in a position operatively associated with the fan belt of the internal combustion engine to properly tension the fan belt and to indicate to the driver of the vehicle should the fan belt be broken;

FIGURE 2 is an enlarged side elevational view of the belt tensioning device;

FIGURE 3 is a longitudinal horizontal sectional view taken substantially upon the plane indicated by section line 3—3 of FIGURE 2;

FIGURE 4 is a transverse vertical sectional view taken substantially upon the plane indicated by section line 4—4 of FIGURE 2.

Referring now more specifically to the drawings, the numeral 10 generally designates a conventional type of internal combustion engine provided with a crankshaft pulley 12 and an endless flexible belt 14 by which the generator pulley 16 and fan pulley 18 are operatively connected to the crankshaft pulley 12. The belt tensioning device is generally designated by the reference numeral 20 and includes a mounting plate 22 having laterally projecting mounting ears 24 thereon for fixedly securing the belt tensioning device 20 to the engine 10 by means of fasteners 26. The fasteners 26 are passed through the elongated slots 28 formed in the mounting ears 24 and may be threadedly engaged in any convenient threaded bores (not shown) formed in the block 30 of the internal combustion engine 10. The mounting plate 22 is provided with a laterally projecting mounting flange 32 which is suitably apertured as at 34 and has secured through the aperture 34 a switch assembly generally referred to by the reference numeral 36. The switch assembly 36 includes a switch unit 38 and a movable actuator 40 which projects from one end of the switch unit 38 and is mounted for longitudinal reciprocating movement relative to the switch unit 38. The inner end of the elongated actuator 40 includes means (not shown) for bridging the terminals 42 and 44 upon inward movement of the actuator 40. The terminals 42 and 44 include screw elements 46 and 48 respectively for securing the switch unit 38 within the electrical circuit of the ignition system (not shown) of the internal combustion engine 10 whereby the ignition circuit will be opened upon outward movement of the actuator 40 and closed upon inward movement of the actuator 40 relative to the switch unit 38.

The switch unit 38 is provided with a bracket 50 and an abutment sleeve 52 carried by the inner end of the actuator 40. A threaded sleeve 54 is carried by the bracket 50 and projects through the aperture 34. A lock nut 56 is threadedly engaged with the sleeve 54 to secure the sleeve 54 through the aperture 34. A compression spring 57 is disposed between the spaced confronting surfaces of the switch unit 38 and the sleeve 52. It will be noted that the abutment sleeve 52 is carried by one end of the actuator 40 for reciprocating movement therewith and that the outer end of the actuator is slidably disposed through the threaded sleeve 54 carried by the bracket 50 in any convenient manner.

An elongated guide member in the form of a hollow sleeve member 58 is rigidly mounted on the mounting plate 22 by means of laterally projecting mounting lugs 60 and 62. The sleeve member 58 is substantially square in cross-section and an elongated thrust member generally referred to by the reference numeral 64 has a first end portion which is substantially square in cross-section snugly and slidably disposed within the sleeve member 58. The one end member 66 abuts the free end of the actuator 40 and the other end of the thrust member 64 has a bifurcated end portion generally designated by the reference numeral 68 thereon. The bifurcated end portion 68 includes a pair of laterally spaced furcations 70 and 72 which are suitably apertured as at 74 and 76. The apertures 74 and 76 are aligned and a bearing roller generally referred to by the reference numeral 78 is journaled for rotation about an axis extending between the furcations 70 and 72 by means of pivot fastener 80. It will be noted that the bearing roller 78 is disposed between the furcations 70 and 72 and that the free ends of the furcations extend a considerable distance beyond the surfaces of the bearing roller 78 remote from the actuator 40.

In operation, the plate member 22 is secured to the engine block 30 as illustrated in FIGURE 1 of the drawings by means of fasteners 26. The fasteners 26 are longitudinally positioned in the slots 28 in a manner whereby the spring 57 will urge the thrust member 64 into engagement with the belt 14 with a portion of the latter being received between the furcations 70 and 72 and in frictional engagement with the bearing roller 78.

The belt 14 is originally tensioned in the conventional manner by properly positioning the generator pulley 16 and the belt tensioning device 20 is positioned relative to the engine block 30 in a manner whereby the tension of the belt 14 will urge the actuator 40 to its inwardmost position. Then, as the belt 14 stretches the spring 57 will urge the thrust member 64 to the left as viewed in FIGURE 1 of the drawings to maintain the proper tensioning of the belt 14. Then, should the belt stretch beyond a predetermined point or break, the spring 57 will urge the actuator 40 to its outermost position illustrated in FIGURES 2 and 3 of the drawings whereby the circuit in which the terminals 42 and 44 are disposed will be opened. This circuit may either be connected to a suitable warning device or may be the ignition circuit of the internal combustion engine whereby the engine 10 will then be stopped thus indicating that the belt 14 should be replaced or properly tensioned by adjusting the generator pulley 16.

It is to be noted that the mounting plate 22 is of a configuration to be adapted to be mounted in various positions relative to the belt 14 and if it is desired the elongated thrust member, inasmuch as the latter is substantially square in cross-section as is the internal area of the sleeve member 58, may be rotated 90° relative to the positions illustrated in FIGURES 1 through 4 if it is desirable to mount the mounting plate 22 in a horizontal plane rather than in a vertical plane as illustrated in FIGURE 1. Thus, the tensioning device 20 is adapted to be constructed in a manner whereby a single device may be used on a maximum number of internal combustion engines provided with fan belts and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A belt tensioning indicator and engine cut-off for use with engines of the type having a normally tensioned endless belt for driving engine accessories and an electrical ignition circuit, said indicator and engine cut-off comprising an elongated guide member, mounting means secured to said guide member adapted to mount said guide member on an engine with one end of said guide member spaced from and in alignment with a section of an endless belt driven by said engine, an elongated thrust member engaged with said guide member for sliding reciprocating movement longitudinally of said guide member, the end of said thrust member corresponding to said one end of said guide member including laterally spaced guide means adapted to embrace the opposite sides of an endless belt and anti-friction means disposed between said laterally spaced guide means adapted to engage the surface of a belt, thrust means yieldably urging said thrust member in one direction to move said one end of said thrust member away from the remote end of said guide member, switch means carried by said mounting means and engageable by said thrust member and adapted to be disposed within said ignition circuit for opening and closing the latter in response to reciprocating movement of said thrust member, said switch means including a movable actuator engageable by said thrust member, said thrust means comprising spring means carried by said switch means and yieldably urging said actuator toward said thrust member for engagement with and movement of the latter to move said guide means and anti-friction means in a direction to engage a belt section.

2. The combination of claim 1 wherein said guide member includes means for mounting said thrust member in any one of at least two rotated positions about the longitudinal axis of said thrust member rotated 90° apart.

3. The combination of claim 2 wherein said thrust member is substantially square in cross section, said guide member comprising an elongated hollow sleeve member substantially square in cross section snugly and slidably receiving said thrust member.

4. A belt tensioning indicator and engine cut-off for use wth engines of the type having a normally tensioned endless belt for driving engine accessories and an electrical ignition circuit, said indicator and engine cut-off comprising an elongated guide member, mounting means secured to said guide member adapted to mount said guide member on an engine with one end of said guide member spaced from and in alignment with a section of an endless belt driven by said engine, an elongated thrust member engaged with said guide member for sliding reciprocating movement longitudinally of said guide member, the end of said thrust member corresponding to said one end of said guide member including laterally spaced guide means adapted to embrace the opposite sides of an endless belt and anti-friction means disposed between said laterally spaced guide means adapted to engage the surface of a belt, thrust means yieldably urging said thrust member in one direction to move said one end of said thrust member away from the remote end of said guide member, switch means carried by said mounting means and engageable by said thrust member and adapted to be disposed within said ignition circuit for opening and closing the latter in response to reciprocating movement of said thrust member, said anti-friction means comprising a roller disposed between said guide means for rotation about an axis extending transversely of said thrust member and between said guide means.

5. The combination of claim 4 wherein said laterally spaced guide means comprises the furcations of a bifurcated end portion on said one end of said thrust member.

References Cited in the file of this patent

UNITED STATES PATENTS

| 1,882,275 | Coughlin | Oct. 11, 1932 |
| 2,104,952 | Saelens et al. | Jan. 11, 1938 |
| 2,187,575 | Schroder | Jan. 16, 1940 |
| 2,222,666 | Jacobson et al. | Nov. 26, 1940 |
| 2,729,810 | Coffey | Jan. 3, 1956 |

FOREIGN PATENTS

| 826,218 | Germany | Dec. 27, 1951 |
| 874,533 | Germany | Apr. 23, 1953 |
| 1,042,967 | Germany | Nov. 6, 1958 |